(12) United States Patent
Nakashima et al.

(10) Patent No.: US 11,150,732 B2
(45) Date of Patent: Oct. 19, 2021

(54) IMAGE PICKUP APPARATUS HAVING VIBRATION DEVICE

(71) Applicant: CANON KABUSHIKI KAISHA, Tokyo (JP)

(72) Inventors: Shinga Nakashima, Yokohama (JP); Toshihiro Ogawa, Tokyo (JP); Takazumi Seo, Tokyo (JP); Akira Watanabe, Tokyo (JP); Kohei Uemura, Kawasaki (JP); Atsuto Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/445,665

(22) Filed: Jun. 19, 2019

(65) Prior Publication Data

US 2019/0391650 A1 Dec. 26, 2019

(30) Foreign Application Priority Data

Jun. 25, 2018 (JP) .............................. JP2018-119773
Apr. 22, 2019 (JP) .............................. JP2019-080723

(51) Int. Cl.
*G06F 3/01* (2006.01)
*H04N 5/232* (2006.01)
(Continued)

(52) U.S. Cl.
CPC .............. *G06F 3/016* (2013.01); *G03B 17/14* (2013.01); *H04N 5/2254* (2013.01); *H04N 5/23216* (2013.01)

(58) Field of Classification Search
CPC ...... G06F 3/016; G03B 17/14; H04N 5/2254; H04N 5/23216
See application file for complete search history.

(56) References Cited

U.S. PATENT DOCUMENTS 9,164,255 B2 10/2015 Uemura
9,348,110 B2 5/2016 Uemura
(Continued)

FOREIGN PATENT DOCUMENTS

CN 1813169 A 8/2006
CN 104660892 A 5/2015
(Continued)

OTHER PUBLICATIONS

Jan. 4, 2021 Chinese Official Action in Chinese Patent Appln. No. 201910543367.0.
(Continued)

*Primary Examiner* — Twyler L Haskins
*Assistant Examiner* — Fayez A Bhuiyan
(74) *Attorney, Agent, or Firm* — Venable LLP

(57) ABSTRACT

An image pickup apparatus includes a vibration device configured to generate a vibration to transmit to a user a touch sense in response to an operation of a user on an operation unit, and a grip portion gripped by the user. A lens barrel is attached to a front surface side of the image pickup apparatus. The grip portion covers a rear surface side and the front surface side of the image pickup apparatus. The grip portion that covers the front surface side of the image pickup apparatus includes a protrusion portion. The vibration device is disposed inside the protrusion portion and on a side facing an optical axis of the lens barrel.

13 Claims, 14 Drawing Sheets

(51) Int. Cl.
  *H04N 5/225*   (2006.01)
  *G03B 17/14*   (2021.01)

(56) References Cited

U.S. PATENT DOCUMENTS

| | | | |
|---|---|---|---|
| 9,442,569 B2 | 9/2016 | Kokubu et al. | |
| 10,241,349 B2 | 3/2019 | Izumi et al. | |
| 2006/0184318 A1* | 8/2006 | Yoshimine | A61H 3/061 |
| | | | 701/433 |
| 2015/0138387 A1* | 5/2015 | Kokubu | G03B 17/02 |
| | | | 348/222.1 |
| 2016/0212328 A1 | 7/2016 | Lee et al. | |

FOREIGN PATENT DOCUMENTS

| | | |
|---|---|---|
| CN | 105142983 A | 12/2015 |
| JP | 2006-136865 A | 6/2006 |
| JP | 2010-178219 A | 8/2010 |
| JP | 2013-157953 A | 8/2013 |
| JP | 2014-203169 A | 10/2014 |

OTHER PUBLICATIONS

Jul. 20, 2021 Chinese Official Action in Chinese Patent Appln. No. 201910543367.0.

* cited by examiner

IMAGE PICKUP APPARATUS HAVING VIBRATION DEVICE

BACKGROUND OF THE INVENTION

Field of the Invention

The present invention relates to an image pickup apparatus, such as a digital camera and an interchangeable lens, which has a vibration device.

Description of the Related Art

Japanese Patent Application Laid-Open No. ("JP") 2006-136865 discloses a camera as the above image pickup apparatus that includes a vibration device (piezoelectric actuator) just below a button, such as a shutter button, that can be pressed by the user, and instructs the vibration device to vibrate in response to the pressing operation to provide the user with an operation sense (reaction or feeling). JP 2013-157953 discloses a camera that enables the user to perceive a properly capturable direction of an object (or gives information on an orientation of the camera) by generating a vibration in a vibration device provided into a shutter button on which the user places his finger or a grip portion held by the user.

The camera includes a variety of operation members that can set one of a plurality of operation positions, such as a rotary ring, a dial, and a slider, and a swingable lever in addition to the button disclosed in JP 2006-136865, can be used for the camera. If a vibration device is provided for each of these operation members or a plurality of vibration devices are provided in a single camera, as disclosed in JP 2013-157953, such may increase the size of the camera.

SUMMARY OF THE INVENTION

The present invention provides an image pickup apparatus that can provide the user with an operation sense for his operation of various operation members using a small number of vibration devices.

An image pickup apparatus according to one aspect of the present invention includes a vibration device configured to generate a vibration to transmit to a user a touch sense in response to an operation of a user on an operation unit, and a grip portion gripped by the user. A lens barrel is attached to a front surface side of the image pickup apparatus. The grip portion covers a rear surface side and the front surface side of the image pickup apparatus. The grip portion that covers the front surface side of the image pickup apparatus includes a protrusion portion. The vibration device is disposed inside the protrusion portion and on a side facing an optical axis of the lens barrel.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1A:
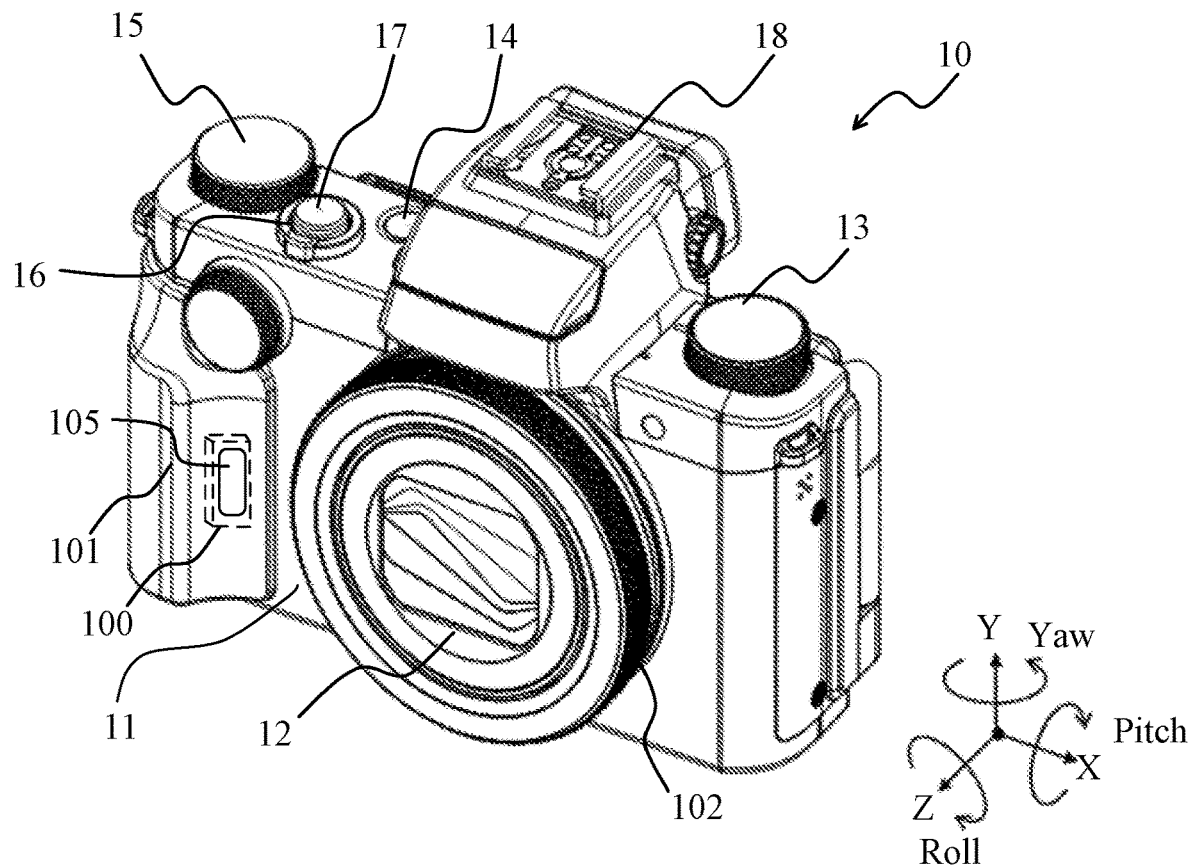
FIG. 1A is a perspective overview of a camera according to a first embodiment of the present invention.
Figure 2A:
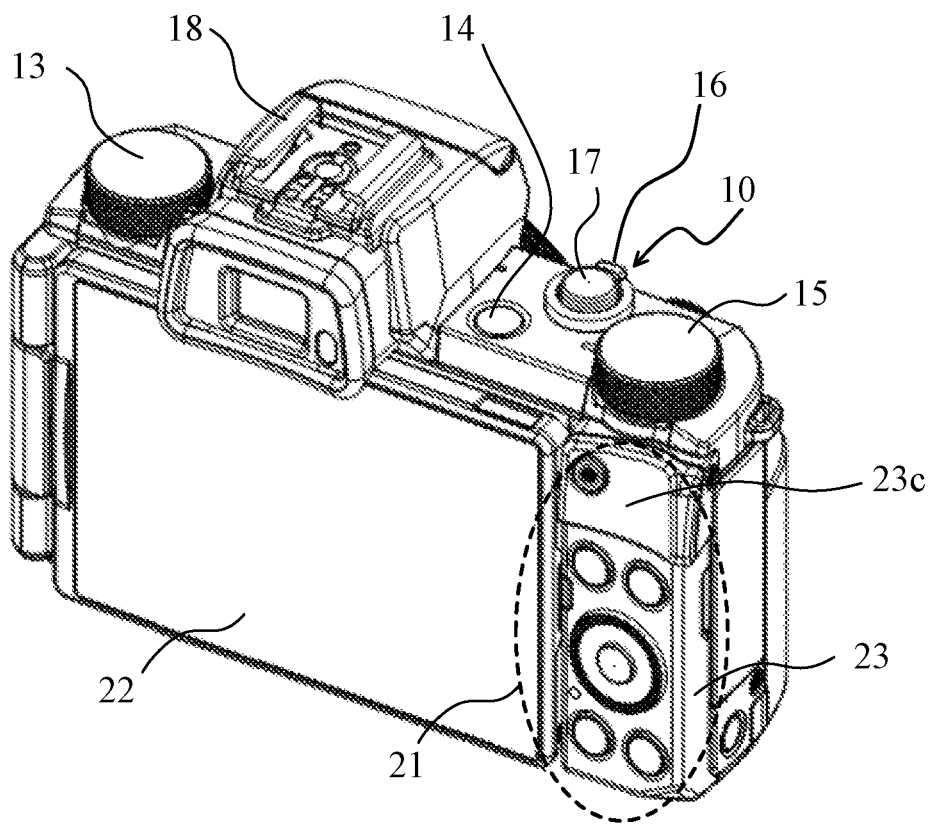
FIG. 2A is a developed view of the camera according to the first embodiment of the present invention.
Figure 2B:
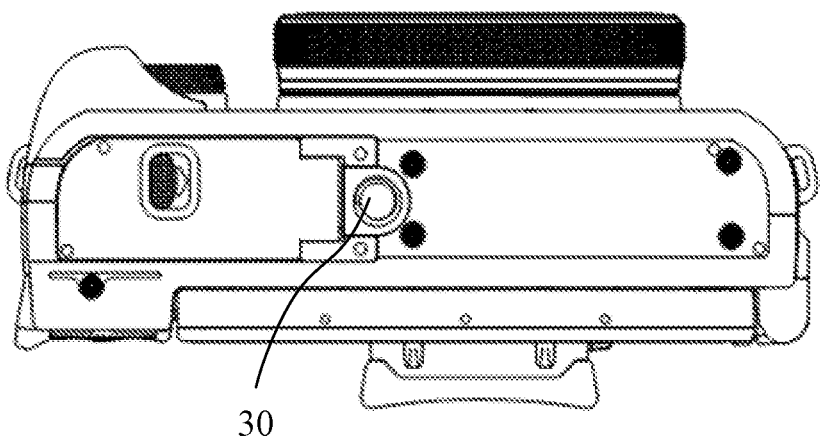
FIG. 2B is a bottom view of a camera according to the first embodiment of the present invention.

Referring now to FIGS. 1A, 2A, and 2B, a description will be given of a configuration of a digital camera (referred to as a camera hereinafter) 10 as an image pickup apparatus (optical apparatus) according to a first embodiment of the present invention. As illustrated in FIG. 1A, an optical axis direction in which an optical axis of a lens barrel unit (optical system) to be described later extends in the camera 10 is set to a Z axis direction, and directions orthogonal to it are set to an X axis direction (horizontal direction) and a Y axis direction (vertical direction). Hereinafter, the X axis direction and the Y axis direction will also be collectively referred to as the X/Y axis direction. A rotational direction around the X axis is set to a pitch direction, and a rotational direction around the Y axis is set to a yaw direction. The pitch direction and the yaw direction (collectively referred to as a pitch/yaw direction hereinafter) are rotational directions around two orthogonal axes as the X axis and the Y axis. The rotational direction around the Z axis is set to a roll direction.

FIG. 1A illustrates a front surface and a top surface of the camera 10. The camera 10 includes a front cover unit 11 constituting a front portion of a body, and a retractable lens barrel unit 12 provided at the center of the front cover unit 11 and imaging light from an object to form an object image. The body includes an image sensor (see FIG. 3) that photoelectrically converts (captures) the object image and generates an image.

A front grip portion 101 for the user to hold the camera 10 by hand is provided to the front cover unit 11 on the left side viewed from the front (object side) or right side viewed from the back. The front grip portion 101 projects to the front side relative to a portion (front cover described later) around the lens barrel unit 12 in the front cover unit 11, and has a shape such that the user can easily hold it with a hand (middle finger or ring finger). A user who grips the front grip portion 101 can operate a release button 17 and a zoom lever 16 described later with the index finger of the hand. Thus, the front grip portion 101 is disposed closer to the release button 17 than the lens barrel unit 12.

A rotational operation ring (operation unit or rotationally operated ring) 102 is around the outer circumference of the lens barrel unit 12 and rotatable around the optical axis. The user can assign any functions for changing an imaging condition to the rotational operation ring 102. For example, the imaging condition such as a focal position and an exposure value can be variably set by rotating the rotational operation ring 102 and by selecting the rotation position (operation position). In other words, the rotational operation ring 102 serves as an operation unit that enables the user to make a setup for imaging, and as an operation unit that enables the user to set one of a plurality of operation positions (rotational positions). The setup for imaging as used in this embodiment also includes switching, adjusting, and the like regarding imaging.

An exposure dial 13 for setting an exposure value, a power button 14, and a mode dial 15 for switching an imaging mode are disposed on the top surface of the camera 10. When the user presses the power button 14 while the camera 10 is powered off, the camera 10 is powered on. When the camera 10 is powered on, the lens barrel unit 12 protrudes forward from the retracted position and is ready for imaging. In this state, a variety of imaging modes can be set when the user rotates the mode dial 15 and selects its rotational position (operation position). The variety of imaging modes contain a manual still image capturing mode in which the user can arbitrarily set the imaging condition such as a shutter speed and an aperture value (F-number), an automatic still image capturing mode that automatically provides an appropriate exposure amount, and a motion image capturing mode for capturing a motion image. In the manual still image capturing mode, an arbitrary exposure value (shutter speed and F-number) can be set when the user rotates the exposure dial 13 and selects its rotational position (operation position). Each of the exposure dial 13 and the mode dial 15 serves as an operation unit that enables the user to make a setup for imaging and as an operation unit that enables the user to set one of a plurality of operation positions (rotational positions).

A zoom lever 16 laterally operated by the user to change the focal length of the lens barrel unit 12, and the release button 17 to be pressed by the user to instruct the imaging are arranged on the top surface of the camera 10. An accessory shoe 18 to which an external flash unit or a microphone can be detachably attached is provided on the top surface of the camera 10.

When the user presses the power button 14 while the camera 10 is powered on, the lens barrel unit 12 is retracted in the body and the camera 10 becomes powered off.

A vibration device 100 is attached to an inner surface of the front grip 101 portion. The vibration device 100 generates a vibration (vibrates) in response to a user operation of the operation unit such as the rotational operation ring 102, the exposure dial 13, the power button 14, the mode dial 15, the zoom lever 16, and the release button 17, and provides the vibration to the front grip portion 101. The vibration device 100 includes, for example, a linear actuator (LRA) type vibration device, a piezoelectric element type, or a VC motor type, and can variably set a vibration parameter, such as a vibration intensity (amplitude) and a vibration frequency. When the vibration parameter is changed, the vibrations of various vibration patterns can be generated.

FIG. 2A illustrates the rear surface of the camera 10. A rear cover unit 23 constituting the rear surface of the body, a rear operation unit (operation unit) 21 provided on the rear cover unit 23, and a display unit 22 are provided on the rear surface of the camera 10. The rear operation unit 21 includes a plurality of buttons and dials, and is provided at the lower side of a rear grip portion 23c of the rear cover unit 23 on which the user puts his thumb when holding the camera 10.

When the camera 10 is powered on and the still or motion image capturing mode is set, the display unit 22 displays a through or live-view image of an object image captured by the image sensor. The display unit 22 displays the imaging parameter indicating the imaging condition, such as the shutter speed and the F-number, and the user changes the set value of the imaging parameter by operating the rear operation unit 21 while viewing the display. The set value of the imaging parameter may be changed by a touch operation (sliding operation) on a slider displayed on the display unit 22 as a touch panel. The slider in this case serves as an operation unit that enables the user to make a setup for imaging, and as an operation unit that enables the user to select one of a plurality of operation positions (sliding positions).

The rear operation unit 21 includes a reproduction button for instructing the recorded captured image to be reproduced, and when the user operates the reproduction button, the captured image is reproduced and displayed on the display unit 22. The vibration device 100 may generate the vibration in accordance with the user operation of the rear operation unit 21.

FIG. 2B illustrates the bottom surface of the camera 10. A tripod seat 30 is provided on the bottom surface of the camera 10. An accessory device, such as a tripod or a jacket, can be attached to the tripod seat 30.

Figure 1B:
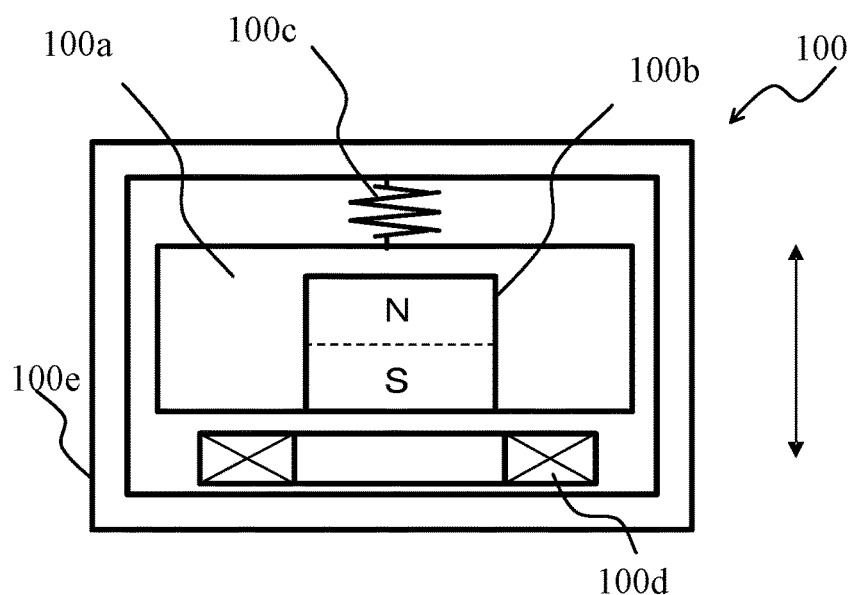
FIG. 1B illustrates an illustrative configuration of an LRA type vibration sensor according to the first embodiment of the present invention.

Referring now to FIG. 1B, a description will be given of an LRA type vibration device as an illustrative vibration device attached to the front grip portion 101. The LRA type vibration device 100 includes a vibrator 100a, a magnet 100b, a spring 100c, a coil 100d, and a base 100e. The vibrator 100a holds the magnet 100b and is movably coupled to the base 100e by the spring 100c. The coil 100d is disposed near the magnet 100b, and electrically connected to a circuit board (see FIG. 4). The coil 100d generates an electromagnetic force when a current is applied from the circuit board, and the vibrator 100a reciprocates due to the attractive force or the repulsive force between the electromagnetic force and the magnet 100b, thereby vibrating the vibration device 100 as illustrated by the arrow in the figure.

Figure 3:
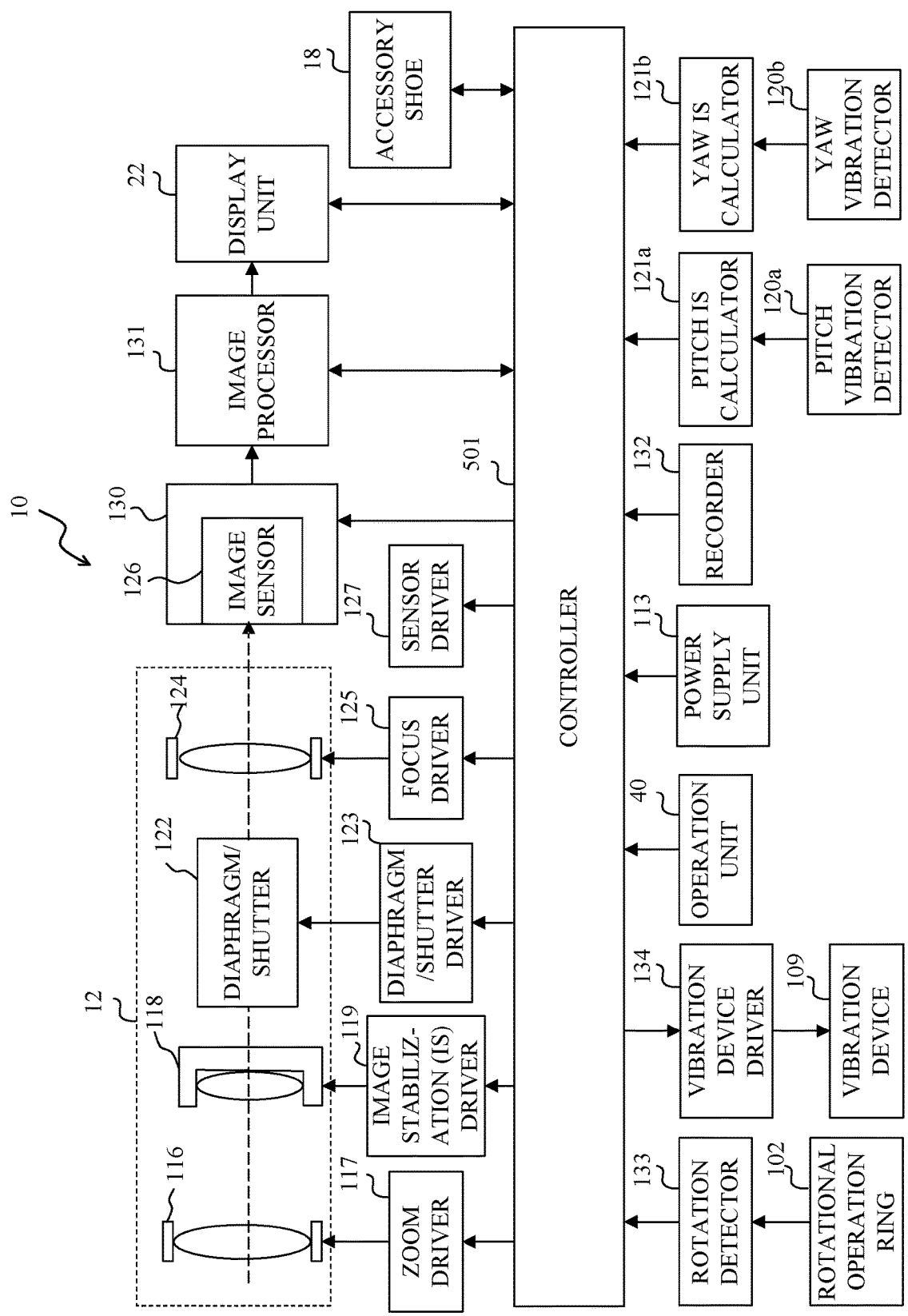
FIG. 3 is a block diagram of the configuration in the camera according to the first embodiment.

FIG. 3 illustrates an electrical and optical configuration of the camera 10. The camera 10 includes a power supply unit 135 for supplying the power to each component described later, and the operation unit 40 including the exposure dial 13, the power button 14, the mode dial 15, the zoom lever 16, the release button 17, and the rear operation unit 21 described above. A controller 501 governs the entire controls over the camera 10. The controller 501 controls the entire camera 10 by reading and executing a control program stored in an unillustrated memory.

The lens barrel unit 12 includes a zoom unit 116 including a zoom lens that moves in the optical axis direction to vary the magnification, and an image stabilization unit 118 including a shift lens as an image stabilizer that reduces (corrects) an image blur. The image stabilization unit 118 performs an image stabilization operation to reduce the image blur by moving (shifting) the shift lens in the X/Y axis direction orthogonal to the optical axis. The lens barrel unit 12 includes a diaphragm/shutter unit 122 that performs a light amount adjusting operation and a shutter operation, and a focus unit 124 which includes a focus lens that is movable in the optical axis direction for focusing.

The camera 10 drives a zoom driver 117 that drives the zoom unit 116 to move the zoom lens, an image stabilization driver 119 that drives the image stabilization unit 118 to shift the shift lens, and a diaphragm/shutter driver 123 that drives the diaphragm/shutter unit 122. The camera 10 also has a focus driver 125 that drives the focus unit 124 to move the focus lens.

When receiving a magnification varying instruction from the operation unit 40, the controller 501 controls driving of the zoom unit 116 via the zoom driver 117 to vary the magnification. The controller 501 controls the diaphragm driving of the diaphragm/shutter unit 122 via the diaphragm/shutter driver 123 according to the set values of the F-number and the shutter speed received from the operation unit 40 or the luminance signal acquired from the image processor 131 described later. The controller 501 controls the shutter driving of the diaphragm/shutter unit 122 via the diaphragm/shutter driver 123 according to the imaging instruction operation on the release button 17. The controller 501 performs the autofocus (AF) by controlling driving of the focus unit 124 via the focus driver 125 in accordance with the focus signal acquired from the image processor 131.

The image sensor 126 photoelectrically converts an object image and outputs an imaging signal. The image processor 131 performs various types of image processing for the captured signal to generate an image signal. The display unit 22 displays an image signal (live-view image) output from the image processor 131, displays the imaging parameter as described above, and reproduces and displays a captured image recorded in a memory 132.

The image sensor 126 is included in a sensor image-stabilization (IS) unit 130 as an image stabilizer. The sensor IS unit 130 performs an image stabilization operation for reducing (correcting) an image blur by moving (shifting) the image sensor 126 in the X/Y axis direction orthogonal to the optical axis. The controller 501 controls imaging by the image sensor 126 and driving of the sensor IS unit 130 (shift position of the image sensor 126) via the sensor driving unit 127.

The camera 10 has a pitch vibration detector 120a and a yaw vibration detector 120b as a vibration (or shake) detector configured to detect a vibration (such as a manual vibration) applied to the camera 10 (referred to as a camera vibration hereinafter). The pitch vibration detector 120a and the yaw vibration detector 120b detects a camera vibration in the pitch direction (rotational direction about the X axis) and the yaw direction (rotational direction about the Y axis) using an angular velocity sensor (vibration gyro) or an angular acceleration sensor, respectively, and outputs a vibration signal.

A pitch IS calculator 121a calculates the shift positions of the lens IS unit 118 (shift lens) and the sensor IS unit 130 (image sensor 126) in the Y axis direction using the vibration signal from the pitch vibration detector 120a. A yaw IS processor 121b calculates the shift positions of the lens IS unit 118 and the sensor IS unit 130 in the X axis direction using the vibration signal from the yaw vibration detector 120b. The controller 501 controls the shift positions of the lens IS unit 118 and the sensor IS unit 130 via the IS driver 119 and the sensor driver 127 according to the shift positions in the pitch and yaw directions calculated by the pitch IS calculator 121a and the yaw IS calculator 121b. Thereby, the image stabilization operation corrects the image blur.

The user can select whether the image stabilization operation is performed by driving either or both of the lens IS unit 118 and the sensor IS unit 130 through the operation unit 40. For example, when the user turns on the setting of the image stabilization operation, the controller 501 determines an imaging scene, and selects an optimal one or both of the lens IS unit 118 and the sensor IS unit 130 for the image stabilization operation.

The image blur in the roll direction may be reduced by rotating the image sensor 126 within the XY plane.

The rotation detector 133 detects the rotational operation of the rotational operation ring 102. When the rotational operation is detected by the rotation detector 133, the controller 501 outputs a drive signal to the vibration device 100 via the vibration device driver 134, and causes the vibration device 100 to generate the vibration. The controller 501 causes the vibration device 100 to generate the vibration when the operation unit 40 is operated. The vibration device 100 vibrates the front grip portion 101 illustrated in FIG. 1A, and thereby the user's hand holding the front grip portion 101 receives a click sense on his rotational operation of the rotational operation ring 102 or the operation of the operation unit 40.

As described above, the set value of the imaging parameter can be changed by the operation of the rear operation unit 21, but the change of the set value of the imaging parameter can also be assigned to the rotational operation of the rotational operation ring 102.

Figure 4:
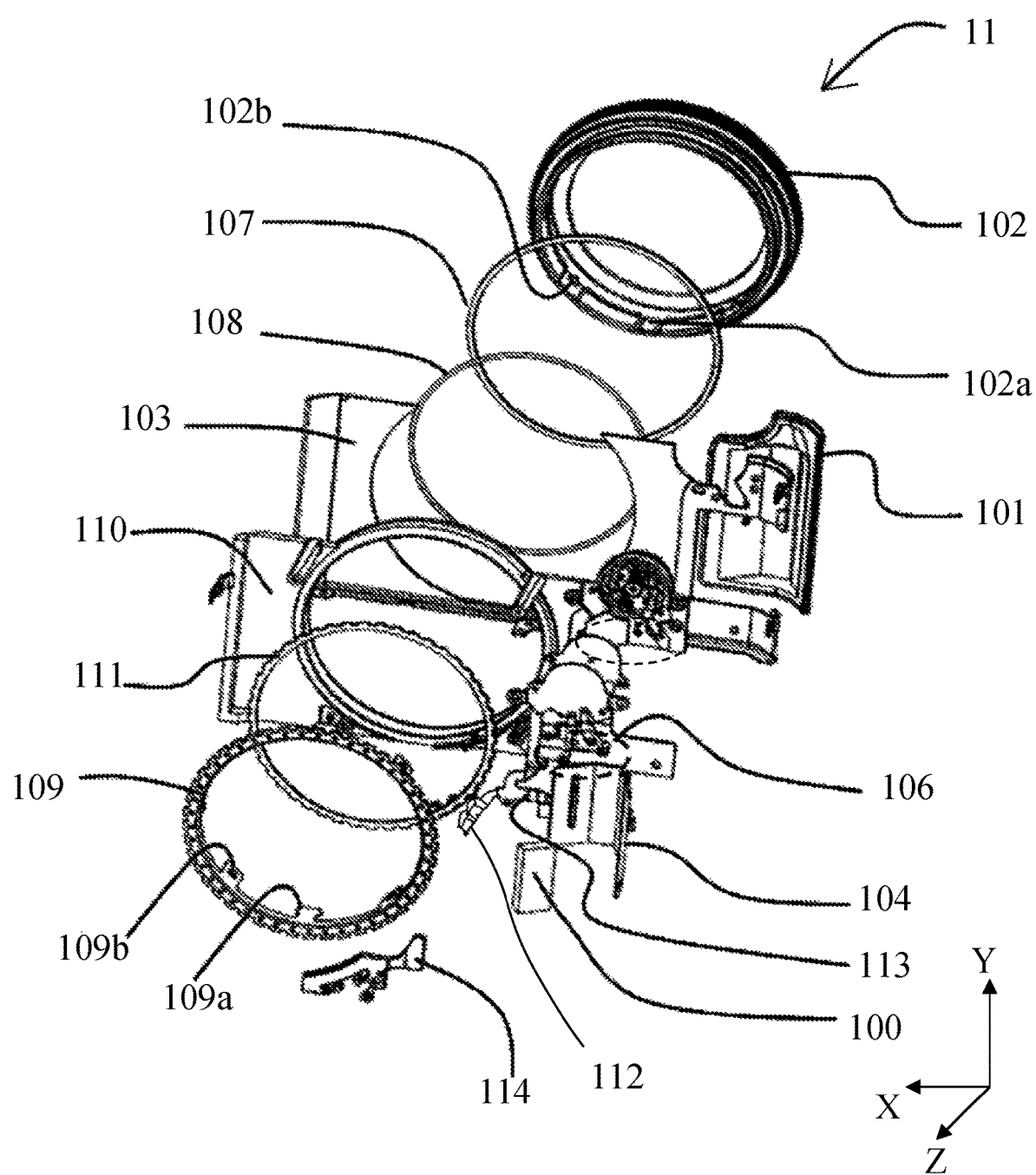
FIG. 4 illustrates a configuration of a front cover unit of the camera according to the first embodiment.

FIG. 4 illustrates the front cover unit 11 in an exploded manner. The front cover unit 11 has a front base member 110, and a front cover 103 as a metal exterior cover is fixed onto the front base member 110 by a double-sided tape or an adhesive. The front grip portion 101 is assembled to the front cover 103 from the outside and fixed by two screws 106 from the inside. As described above, the front grip portion 101 has a shape projecting to the front side from the front cover 103 so that the user can easily hold it. The front grip portion 101a has a two-layered structure of a resin member on the front base member 110 side and an elastic member on the surface side to be gripped by the user.

The front surface of the biasing ring 107 is adhered to a circumferentially extending groove portion in the rotational operation ring 102 by a double-sided adhesive tape. The biasing ring 107 is made of an elastic member and has a cushioning property. The rear surface of the biasing ring 107 includes a sheet for improving the slidability. An O-ring 108 is inserted into the groove from the back of the biasing ring 107. The O-ring 108 is made of a rubber material having a good slidability such as fluorine rubber. The rotational operation ring 102 incorporated with the biasing ring 107 and the O-ring 108 in this manner is assembled to the front base member 110 from the front.

On the other hand, a sliding sheet 111 is attached to the front surface of a rotation detection ring 109. A plurality of concave portions and convex portions are alternately formed on the rotation detection ring 109 at equal intervals in the circumferential direction. These convex portions move in and out between the light emitting portion and the light receiving portion of a photo-interrupter 112 as the rotation detection ring 109 rotates.

The rotation detection ring 109 is assembled into the front base member 110 from the back. At this time, the rotational position of the rotation detection ring 109 is determined so that a plurality of (two in this embodiment) phasing portions 109a in the circumferential direction of the rotation detection ring 109 are engaged with a plurality of phasing recesses 102a in the circumferential direction at the inner circumferential portion of the rotational operation ring 102. Then, a plurality of (four in this embodiment) hooking portions 109b formed to extend forward in the circumferential direction of the rotation detection ring 109 are engaged with a plurality of protrusion portions 102b in the circumferential direction of the rotational operation ring 102. Thus, the rotational operation ring 102 and the rotation detection ring 109 are integrally rotatably coupled to each other.

The above photo-interrupter 112 is mounted onto a flexible circuit board 113. The flexible circuit board 113 is assembled into the front base member 110. When the convex part of the rotation detection ring 109 is located between a light emitting portion and a light receiving portion, the photo-interrupter 112 is in the light shielding state, and the convex portion of the rotation detection ring 109 is not located between the light emitting part and the light receiving part in the light receiving state. The rotation and the rotation amount of the rotation detection ring 109 or the rotational operation ring 102 can be detected by detecting and counting a switch between the light shielding state and the light receiving state.

A substrate holder 114 is assembled into the front base member 110. An arm portion of the substrate holder 114 fixes a flexible circuit board 113 while pressing the rear surface of the flexible circuit board 113 on which the photo-interrupter 112 is mounted.

A vibration device holder 104 as a holder configured to hold the vibration device 100 is attached to the inner surface of the front grip portion 101 by a double-sided tape or an adhesive. The vibration device 100 is fixed onto the vibration device holder 104 by a double-sided tape or an adhesive. The vibration device holder 104 is made of a material such as metal with a few vibration attenuations so that the vibration generated by the vibration device 100 can be easily transmitted to the front grip portion 101. In other words, the vibration device holder 104 is made of a material having a loss coefficient in the vibration smaller than that of the front grip portion 101. An unillustrated electrode of the vibration device 100 is connected to the flexible circuit board 113 assembled into the front base member 110.

Figure 5:
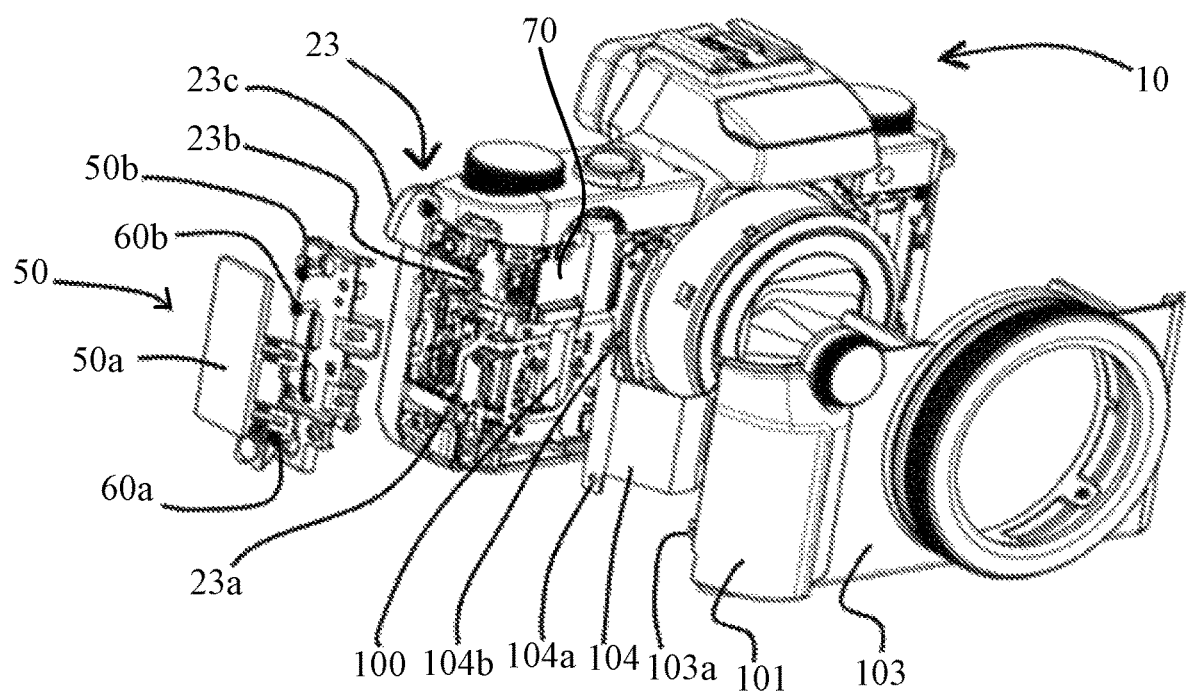
FIG. 5 is an exploded perspective view of the front cover unit.

FIG. 5 illustrates an attachment structure of the vibration device holder 104. A side cover unit 50 that constitutes a side of the body is disposed on the right side of the camera 10. The side cover unit 50 has a side base member 50b, and a side grip portion 50a is provided by fixing the cover member outside of the side base member 50b. The palm of the user holding the camera 10 contacts the side grip portion 50a. The side base member 50b (side cover unit 50) is attached to a main chassis 70 of the camera 10 by a screw.

The vibration device holder 104 attached to the front cover unit 11 has holder fasteners 104a and 104b. The holder fasteners 104a and 104b are located between the side grip portion (cover member) 50a and the rear cover fasteners 23a and 23b provided to extend forward from the rear grip portion 23c of the above rear cover unit 23, and coupled with the rear cover fasteners 23a and 23b by screws 60a and 60b. A front cover fastener 103a provided on the front cover 103 is coupled between the holder fastener 104a and the side grip portion 50a by the screw 60a.

Figure 6A:
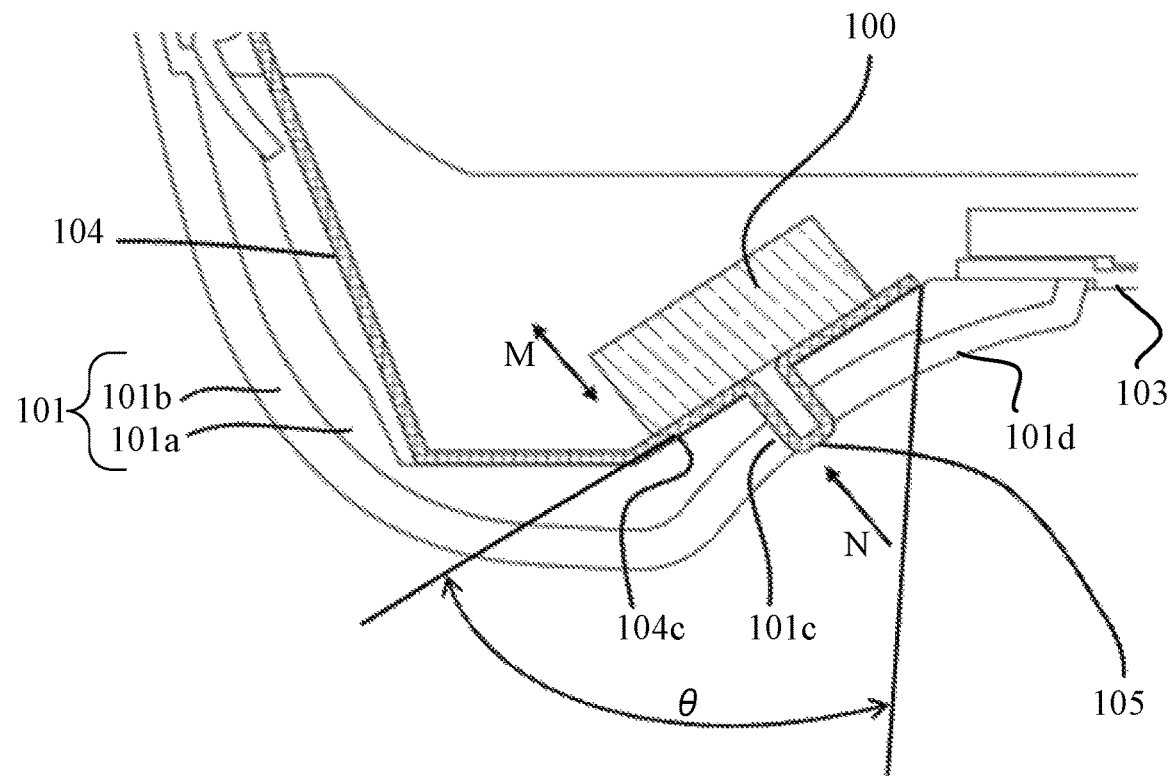
FIG. 6A illustrates the vibration device 100 installed at a tilted portion of an inner surface portion.
Figure 6B:
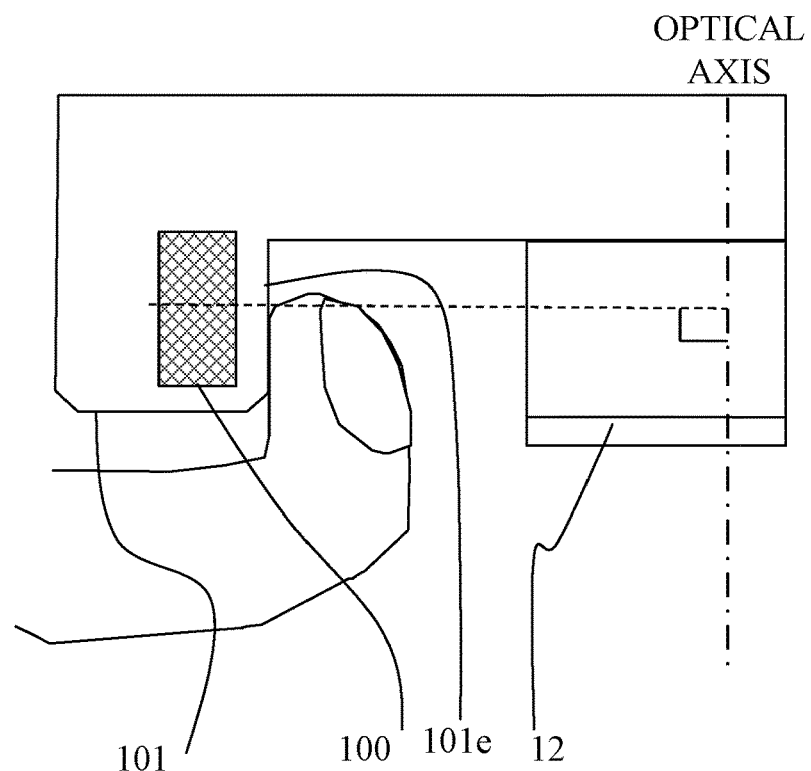
FIG. 6B illustrates the vibration device 100 installed at an upright portion of the inner surface portion

FIGS. 6A and 6B illustrate an attachment structure of the vibration device 100. FIG. 6A illustrates the vibration device 100 installed on a tilted portion of the inner surface portion. The vibration device holder 104 is attached to the inner surface of the front grip portion 101 that protrudes to the front side (lower side in the figure) of the front cover 103. As described above, the front grip portion 101 has a two-layered structure of the resin member 101a for securing the strength and the elastic member 101b covering the outer side (surface side) thereof. The elastic member 101b is made of rubber or an elastomer, and provided so as to prevent the hand of the user gripping the front grip portion 101 from easily slipping. The vibration device holder 104 is attached to the inner surface of the resin member 101a with a double-sided tape or an adhesive.

The vibration device 100 is attached to the inner surface of the vibration device holder 104 by a double-sided tape or an adhesive. The vibration device holder 104 is made of a material such as metal that has a vibration attenuation (absorption) less than or a loss coefficient in vibration lower than that of each of the resin member 101a and the elastic member 101b in the front grip portion 101.

Since this embodiment uses the box-shaped LRA type vibration device for the vibration device 100 as described in FIG. 1B, the fixation with a double-sided tape or an adhesive is available, but part of the vibration device 100 may have a screw seat and may be fixed by screws.

The vibration device 100 is arranged to vibrate in M direction in FIG. 6A. A member for amplifying the vibration in the M direction may be provided with the vibration device 100. Part of the vibration device holder 104 has a protrusion portion 105 which protrudes from the surface of the front grip 101 through a slit-shaped opening 101c formed in the front grip 101. The protrusion portion 105 exposes to the outside of the front grip portion 101 in an area in the front grip portion 101 where the finger (such as a middle finger) of the user's hand holding the grip contacts.

More specifically, the front grip portion 101 is an tilted portion 101d which is tilted at an angle θ relative to the optical axis direction from the frontmost projecting portion toward the front cover 103 (lens barrel unit 12). The finger of the user's hand holding the front grip portion 101 contacts the tilted portion 101d from an N direction which is the same direction as the M direction. The vibration device holder 104 has a tilted surface 104c along the inner surface of the tilted portion 101d, the vibration device 100 is fixed to the inner surface of the tilted surface 104c, and the protrusion portion 105 is provided on the outer surface side of the tilted surface 104c so as to extend in the M direction. The protrusion portion 105 protrudes from the surface of the tilted portion 101d through the opening 101c formed in the tilted portion 101d of the front grip portion 101.

The protrusion portion 105 contacts the user's finger from the N direction with a pressing force required to hold the camera 10. The vibration of the vibration device 100 can be efficiently transmitted to the finger of the user who touches the protrusion portion 105 when the N direction accords with the M direction that is a vibration direction of the vibration device 100 and the protruding direction of the protrusion portion 105.

As described with reference to FIG. 5, the vibration device holder 104 is coupled with the rear cover fasteners 23a and 23b provided to the rear grip portion 23c and the side grip portion 50a by screws 60a and 60b via the holder fastening portions 104a and 104b. Thus, the vibration of the vibration device 100 is efficiently transmitted to the rear surface grip 23c and the side grip 50a via the vibration device holder 104. Thus, the vibration from the vibration device 100 can be efficiently transmitted to the whole hand of the user holding the camera 10. In this embodiment, the vibration device holder 104 corresponds to a first member, and each of the rear surface grip portion 23c and the side grip portion 50a correspond to a second member.

While this embodiment discusses the front cover 103 and the vibration device holder 104 including the separate members, they may be integrally molded with metal. In this case, the front cover 103 has a tilted surface corresponding to the tilted surface 104c illustrated in FIG. 6A, and the vibration device 100 is attached to the inner surface of the tilted surface. The front grip portion 101, the vibration device holder 104, and the front cover 103 may be integrally molded with metal. In this case, the front cover 103 may include a grip portion corresponding to the front grip portion 101 and a tilted surface corresponding to the tilted surface 104c illustrated in FIG. 6A, and the vibration device 100 may be attached to the inner surface of the tilted surface. Then, the front cover 103 corresponds to a first member, and the rear grip portion 23c and the side grip portion 50a coupled to the front cover 103 correspond to a second member. As illustrated in FIG. 6A, this embodiment disposes the grip portion 101 on the tilted surface facing the lens barrel 12. However, as in the example in which the vibration device 100 is installed on the upright portion of the inner surface portion in FIG. 6B, the surface which the fingertip of the user of the grip portion 101 contacts may be parallel to the optical axis of the lens barrel 12 instead of the tilted surface having the angle θ. At this time, the vibration device 100 is adhered to the inner surface of a parallel surface 101e in contact with the fingertip of the user gripping the camera, or to a surface provided parallel to the right angle surface of the holder 104 inside the grip portion 101.

This embodiment describes the vibration device 100 fixed onto the tilted surface 104c of the vibration device holder 104. However, the vibration device 100 may be fixed directly onto the inner surface of the tilted portion 101c of the front grip portion 101 without using the vibration device holder 104 or may be fixed onto the inner surface of the foremost part of the front grip portion 101.

This embodiment instructs the vibration device 100 to generate the vibration in the grip portion in response to the user's operation on a plurality of operation members (102, 13, 14, 15, 16, 17, and 21) at locations different from that of the grip portions (101, 50a, 23c). Thereby, this embodiment can provide the user with an operation sense for his operation of a plurality of (multiple) operation members using a small number of vibration devices 100 (one vibration device 100 in this embodiment). This embodiment instructs the vibration device 100 to generate the vibration for each user operation to each operation position of the operation members (102, 13, 15) having a plurality of operation positions. Thereby, this embodiment can provide the user with a click sense for his operation to each operation position using the single vibration device 100.

Second Embodiment

Next follows a description of a second embodiment according to the present invention. This embodiment will describe an interchangeable lens type digital camera (referred to as a camera hereinafter) as an image pickup apparatus (optical apparatus) to which an interchangeable lens (another optical apparatus) is attachable. In this embodiment, the components common to the first embodiment will be designated by the same reference numerals as those of the first embodiment, and thus a detailed description thereof is omitted.

Figure 7:
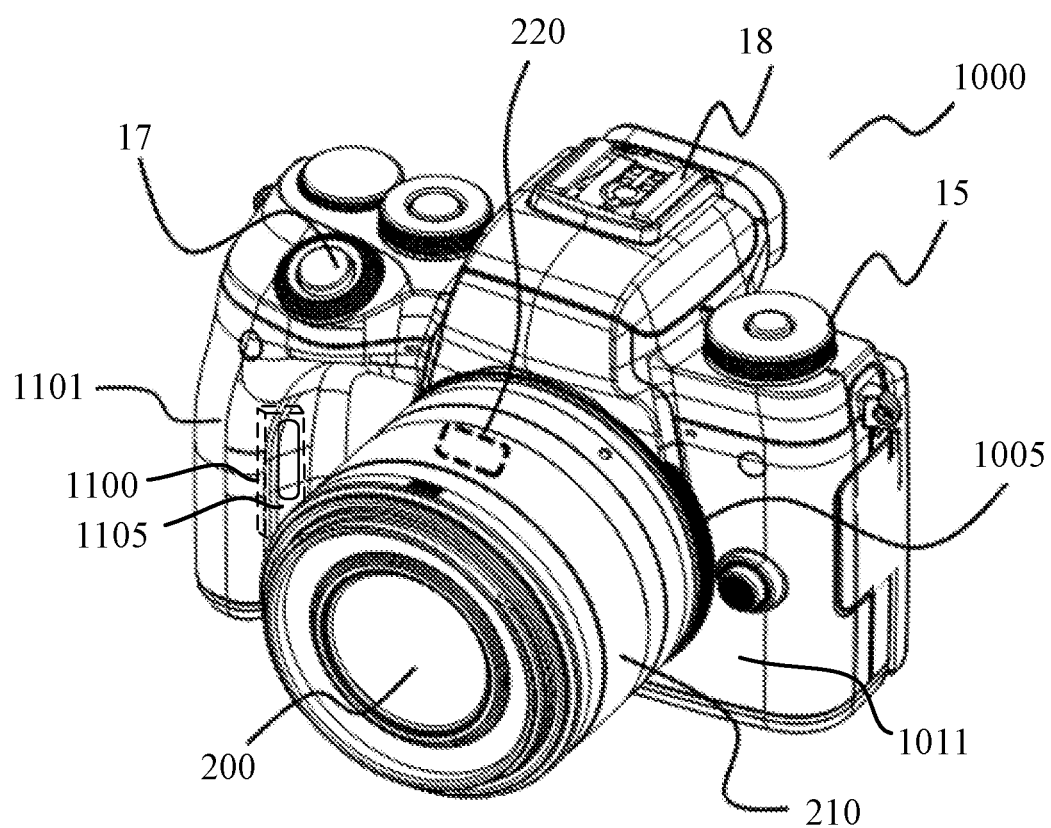
FIG. 7 is a perspective overview of a camera according to a second embodiment of the present invention.
Figure 8A:
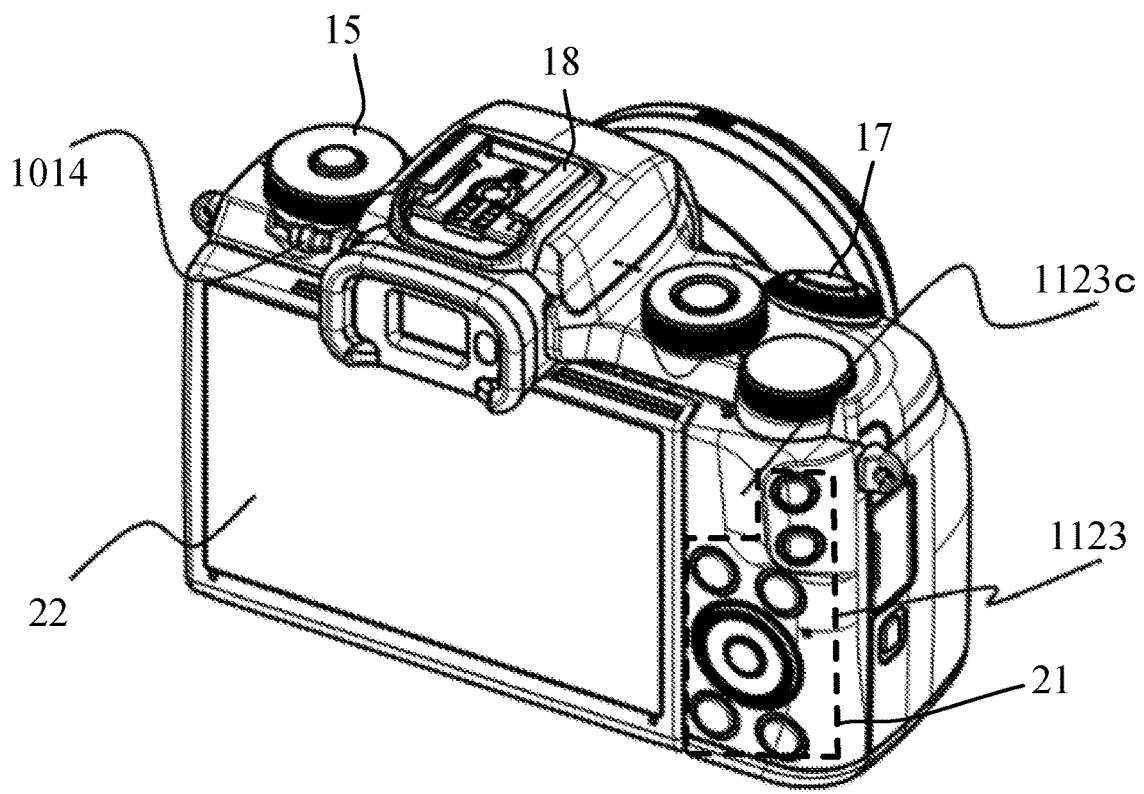
FIGS. 8A and 8B are a rear perspective view and a bottom view of the camera according to the second embodiment.
Figure 8B:
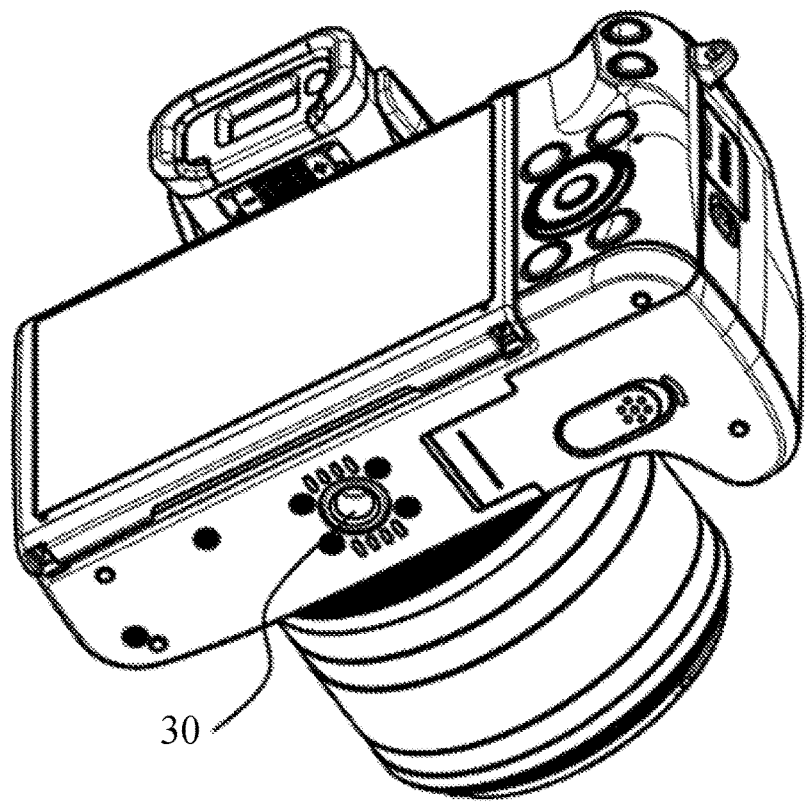

FIG. 7 illustrates a camera 1000 according to this embodiment viewed from the front (object side), and FIG. 8A illustrates the rear surface of the camera 1000. FIG. 8B illustrates the bottom surface of the camera 1000. A front grip portion 1101 is provided on the left side (right side viewed from the back) of a front cover unit 1011 viewed from the front side of the camera 1000, and projects forward for the user to grip the camera 1000. A vibration device (referred to as a camera-side vibration device hereinafter) 1100 that is the same as the vibration device 100 described in the first embodiment, is provided inside the front grip portion 1101. The front grip portion 1101 has a protrusion portion 1105 on an unillustrated vibration device holder similar to the vibration device holder 104 described in the first embodiment. A mount portion 1005 is provided at the center of the front of the camera 1000, which makes the interchangeable lens 200 attachable and detachable.

The configuration of the front cover unit 1011 and the attachment structure of the camera-side vibration device 1100 in this embodiment are the same as those of the first embodiment, and thus a description thereof will be omitted. Operation members such as the mode dial 15, the release button 17, and the accessory shoe 18 are provided on the top surface of the camera 1000 as in the first embodiment. As illustrated in FIG. 2A, a power lever 1014 instead of the power button 14 of the first embodiment is provided on the top surface of the camera 1000.

A rear cover unit 1123 constituting the rear surface of the body, and the rear operation unit 21 and the display unit 22 similar to those of the first embodiment are provided on the rear surface of the camera 1000. The rear operation unit 21 covers the lower side of a rear grip portion 1123c to which the user puts his thumb when gripping the camera 1000 in the rear cover unit 1123 and the right side of the rear grip portion 1123c when viewed from the back.

A rotational operation ring 210 is provided on the outer circumference of the interchangeable lens 200, and can be operated by the user to rotate around the optical axis of the interchangeable lens 200. A user can assign a function for changing the imaging condition, such as a focus position and an exposure value, to the rotational operation ring 210. The rotational operation ring 210 serves as an operation unit that provides the user operation for imaging and as an operation unit that enables the user to set one of a plurality of operation positions.

A lens-side vibration device 220 is provided inside the interchangeable lens 200 (inside the rotational operation ring 210). The lens-side vibration device 220 is, for example, a linear actuator (LRA) type, piezoelectric element type, or VC motor type vibration device similar to the camera-side vibration device 1100, and enables the vibration parameter, such as a vibration intensity (amplitude) and a vibration frequency, to be variably set.

The lens-side vibration device (first vibration device) 220 and the camera-side vibration device (second vibration device) 1100 can generate the vibration in accordance with the user operation of the rotational operation ring 210 as a lens-side operation unit (first operation unit). The lens-side vibration device 220 and the camera-side vibration device 1100 can generate the vibration in accordance with the user operation of the power lever 1014, the mode dial 15, the release button 17, and the rear operation unit 21 as a camera-side operation unit (second operation unit). This configuration provides the front grip portion 1101 and the rotational operation ring 210 with the vibration and the user with an operation sense. The user can arbitrarily set whether to generate the vibration in only one of the camera-side vibration device 1100 and the lens-side vibration device 220 or in both.

Even when the interchangeable lens 200 is not provided with the lens-side vibration device 220, the camera-side vibration device 1100 can be vibrated in accordance with the user operation of the rotational operation ring 210.

As illustrated in FIG. 2B, the same tripod seat 30 as that of the first embodiment is provided on the bottom surface of the camera 1000.

Figure 9:
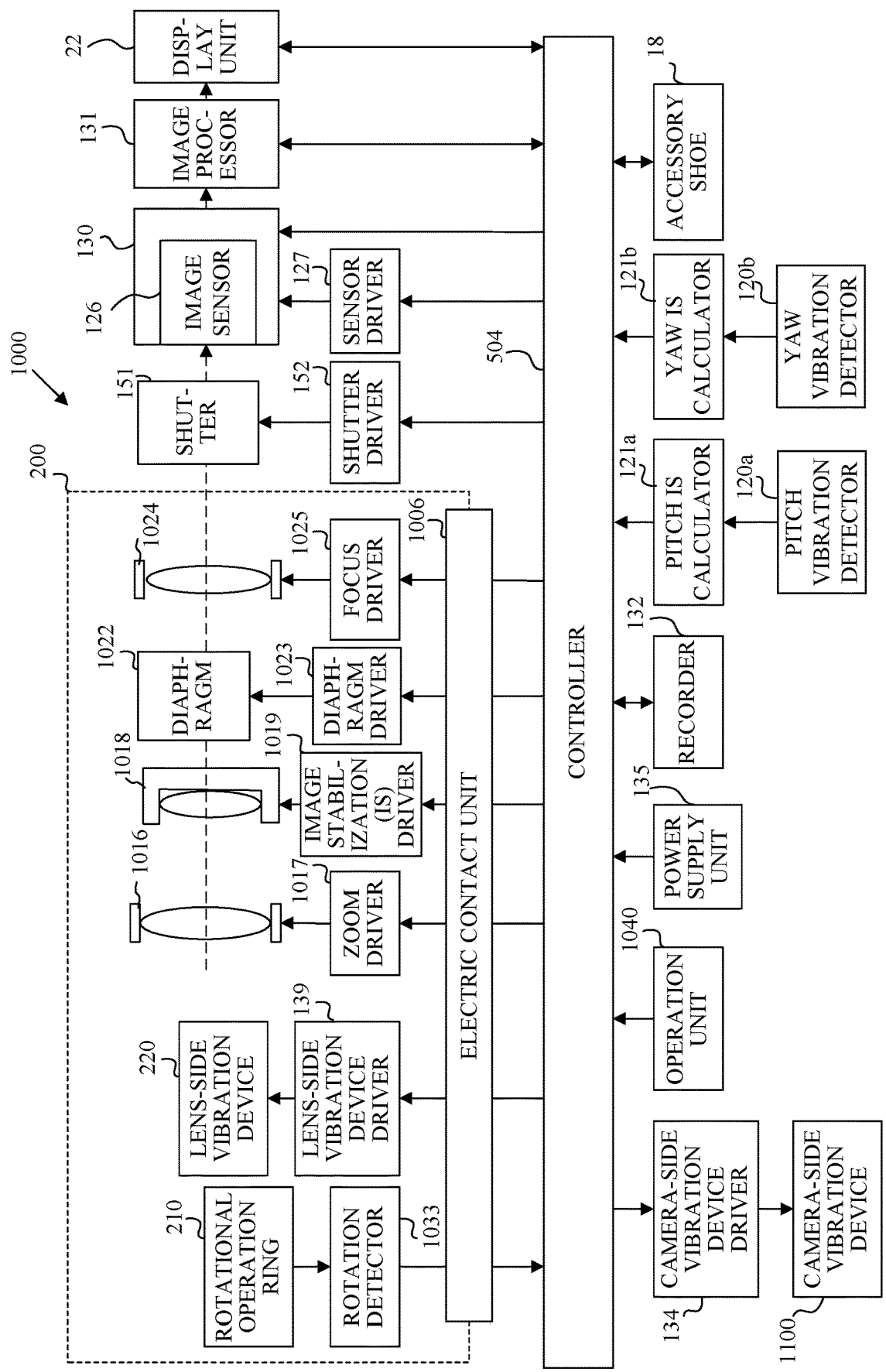
FIG. 9 is a block diagram of the configuration in the camera according to the second embodiment.

FIG. 9 illustrates an electrical and optical configuration of the camera 1000 and the interchangeable lens 200 according to this embodiment. The same elements of the camera 1000 in the figure as those of the camera 100 in FIG. 3 of the first embodiment will be designated by the same reference numerals, and a description thereof will be omitted.

The camera 1000 includes an operation unit 1040 that has the power lever 1014, the mode dial 15, the release button 17, and the rear operation unit 21. In this embodiment, the controller 501 controls the entire imaging system including the camera 1000 and the interchangeable lens 200. At this time, the controller 501 communicates with the interchangeable lens 200 via an electric contact unit 1006 provided in the mount portion 1005.

The interchangeable lens 200 includes a zoom unit 1016 that includes a zoom lens configured to move in the optical axis direction for the magnification variation, and a lens IS unit 1018 that includes a shift lens configured to move (shift) in the X/Y axis direction orthogonal to the optical axis to reduce (or correct) the image blur. The interchangeable lens 200 has a diaphragm unit 1022 having a light amount adjustment function, and a focus unit 1024 including a focus lens movable in the optical axis direction for focusing.

The interchangeable lens 200 has a rotation detector 1033 that detects a rotation of the rotational operation ring 210. The controller 501 controls driving of the zoom unit 1016 for the magnification variation via the zoom driver 1017 provided to the interchangeable lens 1002 when the rotational operation ring 210 is operated and a magnification variation instruction is input via the rotation detector 1033. The controller 501 controls driving of the diaphragm unit 1022 via a diaphragm driver 1023 provided in the interchangeable lens 200 according to the set value of the F-number received from the operation unit 1040 or the luminance signal acquired from the image processor 131. The controller 501 performs the AF by controlling driving of the focus unit 1024 via a focus driver 1025 provided in the interchangeable lens 200 in accordance with the focus signal acquired from the image processor 131.

The interchangeable lens 200 includes an image stabilization driver 1019 that drives the lens IS unit 1018. The pitch IS calculator 121a and the yaw IS calculator 121b in the camera 1000 calculate the shift positions in the pitch/yaw direction using the shift signals from the camera-side pitch vibration detector 120a and the camera-side yaw vibration detector 120b. The controller 501 controls the shift positions of the lens IS unit 1018 and the sensor IS unit 130 via the image stabilization driver 1019 and the sensor driver 127 according to the calculated shift positions. Thereby, the image stabilization operation corrects the image blur.

A vibration detector and an image stabilization calculator are provided to the interchangeable lens 200, and the shift positions of the lens IS unit 1018 and the sensor IS unit 130 are controlled according to the shift position calculated by the image stabilization calculator.

The camera 1000 includes a shutter unit 151 that performs a shutter operation, and a shutter driver 152 that drives the shutter unit 151. The controller 501 controls driving of the shutter unit 151 via the shutter driver 152 in accordance with the imaging instruction operation through the release button 17.

When detecting the rotational operation of the rotational operation ring 210 through the rotation detector 1033, the controller 501 causes a lens-side vibration device driver 139 to output a drive signal to the lens-side vibration device 220, and causes the lens-side vibration device 220 to generate the vibration. The controller 501 can cause the camera-side vibration device driver 134 to output a drive signal to the camera-side vibration device 1100 and cause the camera-side vibration device 1100 to generate the vibration. As described above, the user can arbitrarily select which of the lens-side vibration device 220 and the camera-side vibration device 1100 is to generate the vibration.

The controller 501 causes the camera-side vibration device 1100 or the lens-side vibration device 220 to generate the vibration in response to the user operation of the rotational operation ring 210 and the user operation of the operation unit 1040. In this case, the user can arbitrarily select which of the camera-side vibration device 1100 and the lens-side vibration device 220 is to generate the vibration.

This embodiment can cause the camera-side vibration device 1100 to generate the vibration provided in the grip portion in response to the user operation of a plurality of operation members (210, 13, 14, 15, 16, 17, and 21) provided at locations different from the grip portion (1101). Thereby, this configuration can provide the user with an operation sense for his operation of a plurality of (multiple) operation members using a small number of (one in this embodiment) camera-side vibration devices 1100. The lens-side vibration device 220 provided in the interchangeable lens 200 can provide the user with an operation sense for his operation of a plurality of operation members provided in the camera 1000.

Figure 10:
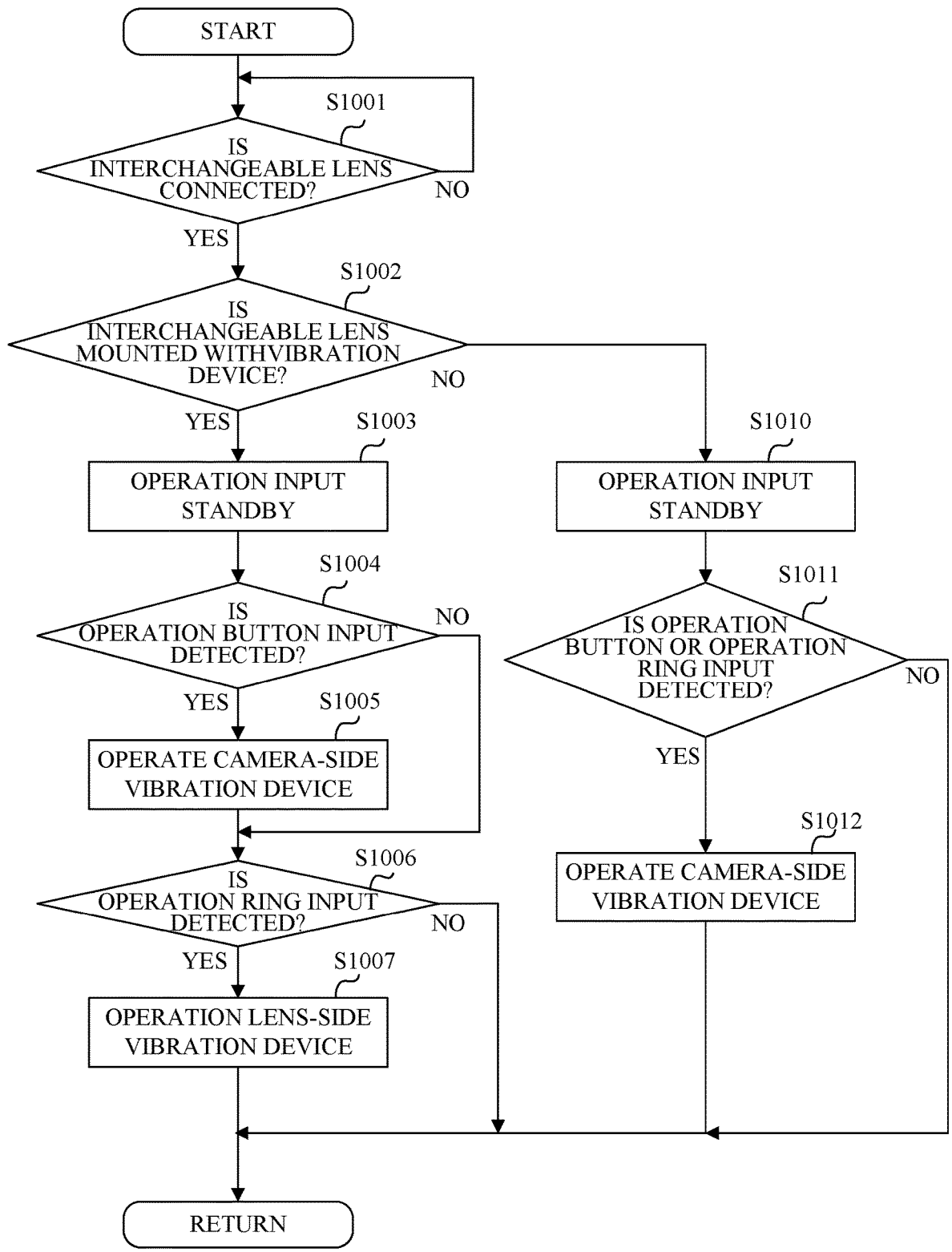
FIG. 10 is a flowchart of vibration control processing according to the second embodiment.

A flowchart in FIG. 10 illustrates vibration control processing performed by the controller 501. The controller 501 executes this processing in accordance with a control program as a computer program. This embodiment performs different processing depending on whether the interchangeable lens 200 having the lens-side vibration device 220 is attached to the camera 1000 or the interchangeable lens having no lens-side oscillating device 220 is attached. In the following description, "S" stands for the step.

In S1001, the controller 510 detects whether or not the interchangeable lens is attached to camera 1000, based on detecting whether or not a signal is input from the interchangeable lens via the electric contact unit 1006. When detecting that the interchangeable lens has been mounted, the controller 501 proceeds to S1002, and determines whether the mounted interchangeable lens is the interchangeable lens 200 having the lens-side vibration device 220 or the interchangeable lens having no lens-side vibration device 220. The controller 510 proceeds to S1003 when the interchangeable lens 200 having the lens-side vibration device 220 is attached, and proceeds to S1010 when the interchangeable lens having no lens-side vibration device 220 is attached.

In S1003, the controller 501 waits for an operation input from the operation unit 1040 and the rotational operation ring 210 (rotation detector 1033). Then, in S1004, the controller 501 that has detected an operation input from the operation unit (labeled as an operation button in the drawing) 1040 proceeds to S1005, and if it does not detect the operation input from the operation unit 1040, the flow proceeds to S1006.

In S1005, the controller 501 causes the camera-side vibration device 1100 to generate the vibration via the camera-side vibration device driver 134. The operation unit 1040 is provided in the camera 1000, and the user operates the operation unit 1040 while holding the camera 1000 by hand. Thus, an operation sense by the vibration can be transmitted to the user by causing the camera-side vibration device 1100 to generate the vibration.

Next, in S1006, the controller 501 that has detected the operation input from the rotational operation ring 210 proceeds to S1007, and causes the lens-side vibration device 220 to generate the vibration via the lens-side vibration device driving unit 139. At this time, the controller 501 causes the lens-side vibration device 220 to generate the vibration for each predetermined rotation amount (each of a plurality of operation positions) of the rotational operation ring 210. Since the vibration from the lens-side vibration device 220 is transmitted to the rotational operation ring 210 held by the user for each predetermined rotation amount, the click sense can be transmitted as the operation sense accompanied by the rotational operation of the rotational operation ring 210 to the user. The controller 501 returns from S1007 to S1001 (or S1002).

On the other hand, in S1010, the controller 501 waits for the operation input from the operation unit 1040 and the rotational operation ring 210 (rotation detector 1033). Then, in step S1011, the controller 501 that has detected the operation input from the operation unit 1040 or the rotational operation ring 210 proceeds to S1012, and causes the camera-side vibration device 1100 to generate the vibration via the camera-side vibration device driver 134. The controller 501 returns from S1012 to S1001 (or S1002).

As described above, in this embodiment, when both the camera 1000 and the interchangeable lens 200 include the vibration devices 1100 and 220, the vibration device that generates the vibration is selected based on the operation member (the operation unit 1040 and the rotational operation ring 210) operated by the user. Thereby, the excessive vibration and power consumption can be suppressed, and the vibration can be efficiently transmitted to the user to give an operation sense. When the interchangeable lens 200 mounted on the camera 1000 has no vibration device, the camera-side vibration device 1100 is instructed to generate the vibration whichever operation member the user operates, thereby providing the user with the operational sense through the vibration.

The vibration devices 1100 and 220 provided in the camera 1000 and the interchangeable lens 200 may be selected not only according to the operation member described above, but also according to the mode of the camera 1000. For example, the camera-side vibration device 1100 generates the vibration for the user operation in the setting mode for setting the camera 1000, and the lens-side vibration device 220 may generate the vibration for the user operation for changing the imaging parameter, such as the F-number and the shutter speed, in the imaging mode.

This embodiment describes the controller 501 in the camera 1000 controlling driving of the camera-side and lens-side vibration devices 1100 and 220. Alternatively, the interchangeable lens may include a controller that controls driving of the camera-side and lens-side vibration devices 1100 and 220.

Third Embodiment

Figure 11:
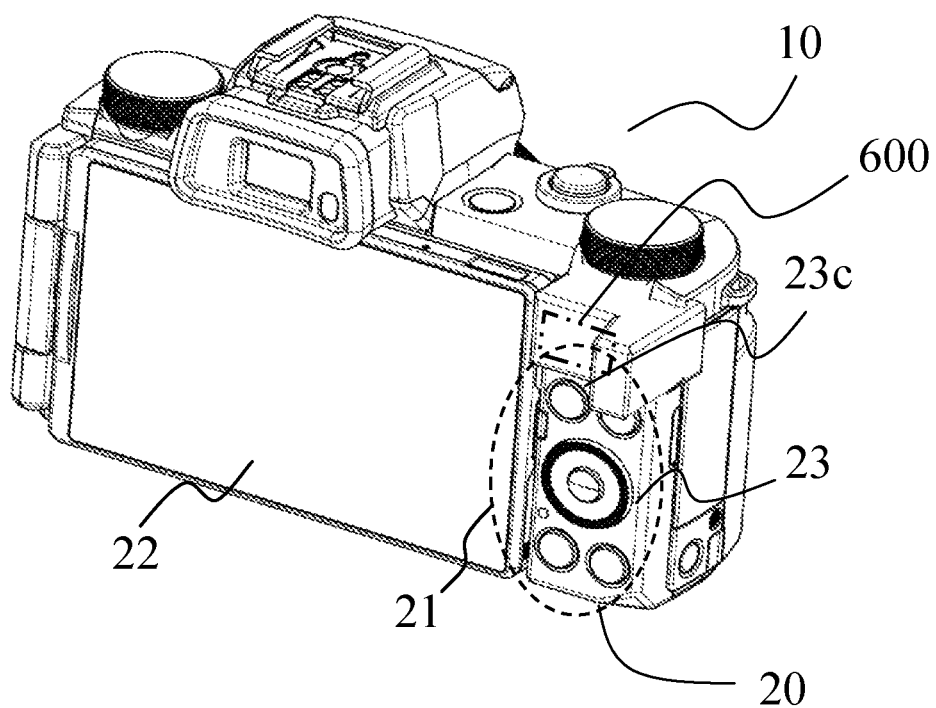
FIG. 11 is a rear perspective view of a camera according to a third embodiment of this embodiment.

Referring now to FIG. 11, a description will be given of a configuration of a digital camera (referred to as a camera hereinafter) 10 as an image pickup apparatus (optical apparatus) according to a third embodiment of the present invention. In this embodiment, the same elements as those of the first embodiment will be designated by the same reference numerals as those of the first embodiment, and a detailed description thereof will be omitted. The configuration in the third embodiment is the same as that of the first embodiment except for a rear grip portion 23c of the camera 10, and will be described with the same reference numerals. The third embodiment will describe the vibration device 100 disposed inside the front grip portion 101 of the camera 10 as the front vibration device 100.

FIG. 11 is a rear perspective view according to the third embodiment. FIG. 11 illustrates the rear surface of the camera 10. Provided on the rear surface of the camera 10 are the rear cover unit 23 constituting the rear surface of the body, the rear operation unit (operation unit) 21 provided on the rear cover unit 23, and the display unit 22. The rear operation unit 21 includes a plurality of buttons and dials, and is located at the lower side of the rear grip portion 23c of the rear cover unit 23 on which the user puts a thumb when holding the camera 10. The rear grip portion 23c protrudes from the camera 10.

The rear vibration device 600 is attached to the inner surface of the rear grip portion 23c. Similar to the front vibration device 100 attached to the inside of the front grip portion 101, in response to the user operation of the operation unit, such as the rotational operation ring 102, the exposure dial 13, the power button 14, the mode dial 15, the zoom lever 16, and the release button 17, the rear vibration device 600 generates the vibration and provides it to the rear grip portion 23c. The rear vibration device 600 is, for example, a vibration actuator of a linear actuator (LRA) type, a piezoelectric element type, or a VC motor type, and enables the vibration parameter, such as a vibration intensity (amplitude) and a vibration frequency, to be variably set. Vibrations of a variety of vibration patterns can be generated by changing the vibration parameter.

When the camera 10 is powered on and the still or motion image capturing mode is set, the display unit 22 displays a through or live-view image of an object image captured by the image sensor. The display unit 22 displays the imaging parameter indicating the imaging condition, such as the shutter speed and the F-number, and the user changes the set value of the imaging parameter by operating the rear operation unit 21 while viewing the display. The set value of the imaging parameter may be changed by a touch operation (sliding operation) on a slider displayed on the display unit 22 as a touch panel. The slider in this case serves as an operation unit that enables the user to make a setup for imaging, and as an operation unit that enables the user to select one of a plurality of operation positions (sliding positions).

The rear operation unit 21 includes a reproduction button for instructing the recorded captured image to be reproduced, and when the user operates the reproduction button, the captured image is reproduced and displayed on the display unit 22. The front vibration device 100 and the rear vibration device 600 may generate the vibrations in response to the user operation of the rear operation unit 21.

Referring now to a schematic diagram of an arrangement of the rear vibration device according to the third embodiment in FIGS. 12A and 12B, a description will be given of an attachment configuration of the rear vibration device 600 provided onto the inner surface in the rear grip portion 23c.

Figure 12A:
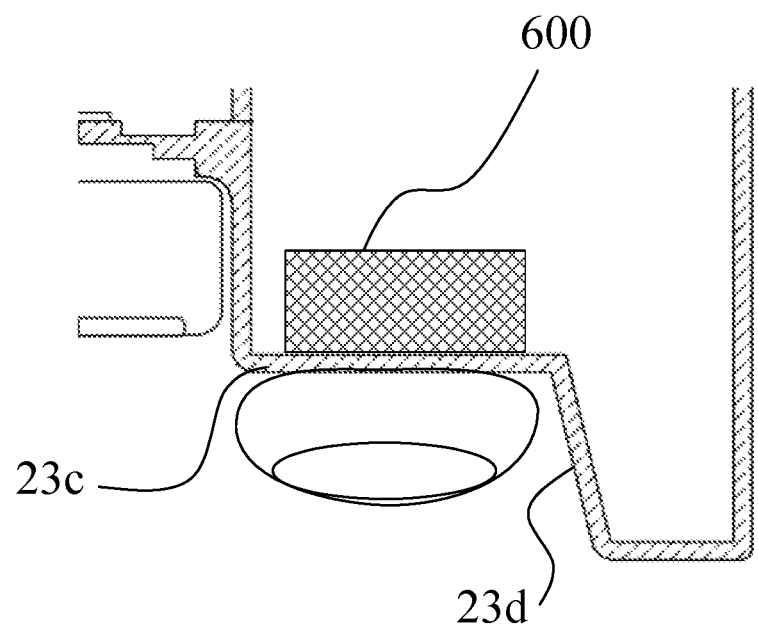
FIG. 12A is a schematic sectional view of one illustrative arrangement of a rear vibration device 600 according to the third embodiment.

FIG. 12A is a schematic sectional view of one illustrative arrangement of the rear vibration device 600 according to the third embodiment. When the user grips the camera 10, part of the rear cover unit 23 is configured such that his thumb can easily grip the rear grip portion 23c. In this embodiment, part of the rear cover unit 23 protrudes to form the rear grip portion 23c. The rear cover unit 23 includes a rear grip upright wall portion 23d having a slope projecting from the rear grip portion 23c for a configuration where the thumb is hard to slip in holding the camera 10 and the finger is easily hooked even in non-image capturing.

The rear vibration device 600 is provided on the inner side of the rear grip portion 23c. Since the rear vibration device 600 is close to the tip of the thumb that applies a force in gripping the camera, the vibration is effectively transmitted when the rear vibration device 600 vibrates. This embodiment forms the rear surface grip 23c substantially horizontal to the rear portion of the camera 10, and disposes the rear vibration device 600 in the rear grip portion 23c. Since the rear vibration device 600 is configured to generate the vibration perpendicular to the attachment surface, the pressing direction of the thumb is substantially the same as the vibration direction when the user grips the camera 10, so the vibration can be efficiently applied to the finger.

Figure 12B:
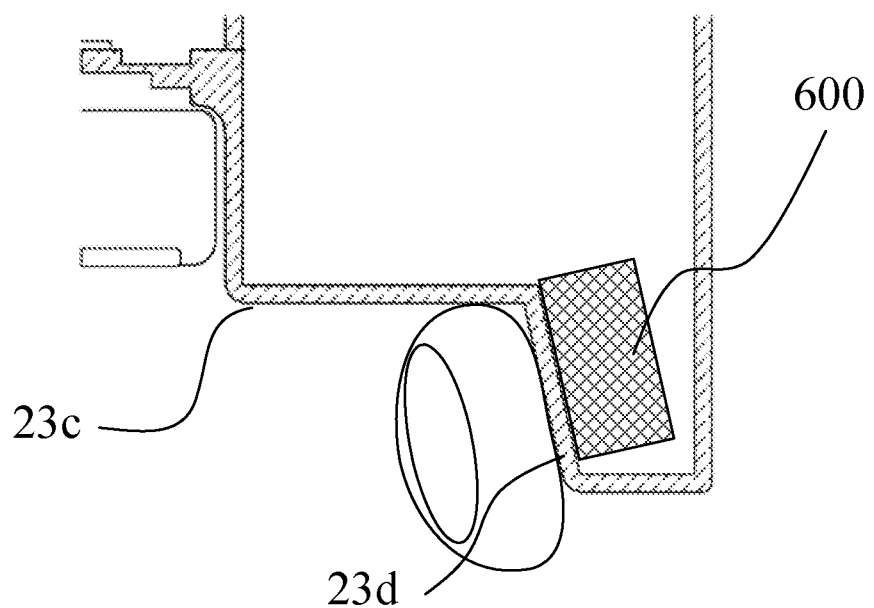
FIG. 12B is a schematic sectional view of another illustrative arrangement of the rear vibration device 600 according to the third embodiment.

FIG. 12B is a schematic sectional view in a different arrangement example of the rear vibration device 600 according to the third embodiment. In this embodiment, the vibration device is disposed inside the rear grip upright wall portion 23d. The rear grip upright wall portion 23d is shaped so that the thumb portion is easily hooked when the user grips the camera, so the thumb may be hooked on the rear surface grip upright wall portion 23d in the non-imaging time or in a non-aiming time. Then, when the rear vibration device 600 frequently vibrates, the rear vibration device 600 may be disposed on the rear grip upright wall portion 23d. This embodiment disposes the rear vibration device 600 on the rear grip portion 23c substantially horizontal to the rear surface or the rear grip upright wall portion 23d provided with the tilted portion, but the present invention is not limited to this embodiment. The rear vibration device 600 may be placed inside a part where the finger is placed when the camera 10 is gripped, and the place where the finger is placed may be curved.

Figure 13:
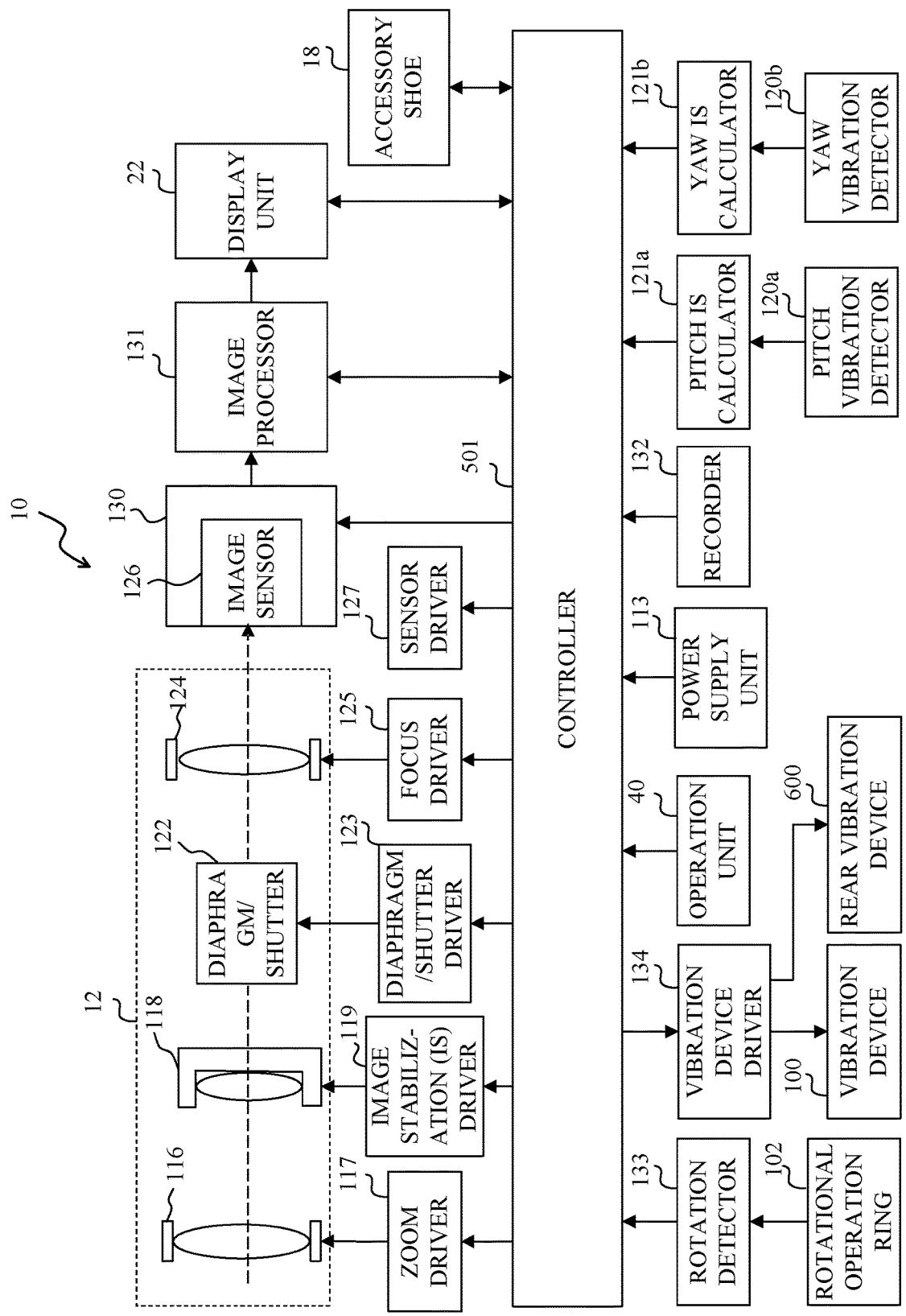
FIG. 13 is a block diagram of the configuration in the camera according to the third embodiment.

A block diagram in FIG. 13 illustrates an electrical and optical configuration of the camera 10 according to the third embodiment. The camera 10 includes the power supply unit 135 for supplying the power to each component as described in the first embodiment, and the operation unit 40 including the exposure dial 13, the power button 14, the mode dial 15, the zoom lever 16, the release button 17, and an the rear operation unit 21. The controller 501 governs the overall control of the camera 10.

The controller 501 controls the entire camera 10 by reading and executing a control program stored in an unillustrated memory. The control configuration in the third embodiment corresponds to the configuration of the first embodiment to which the rear vibration device 600 is added. The controller 501 outputs a drive signal to the front vibration device 100 or the rear vibration device 600 via the vibration device driver 134 to cause the front vibration device 100 or the rear vibration device 600 to generate the vibration. The controller 501 outputs the drive signal to the front vibration device 100 or the rear vibration device 600, for example, when the rotation ring 102 is operated or the operation unit 40 is operated. The pitch vibration detector 120a or the yaw vibration detector 120b may detect the tilt based on the signal input result to the controller 501, and may provide the vibration that induces the vibration device 100 or the rear vibration device 600 to correct the tilt. For example, when the camera 10 is tilted downwardly, the rear vibration device 600 vibrates to guide the camera 10 upwardly, or when the camera 10 is tilted upwardly, the vibration device 100 on the front side is vibrated to induce the downward tilt.

Figure 14:
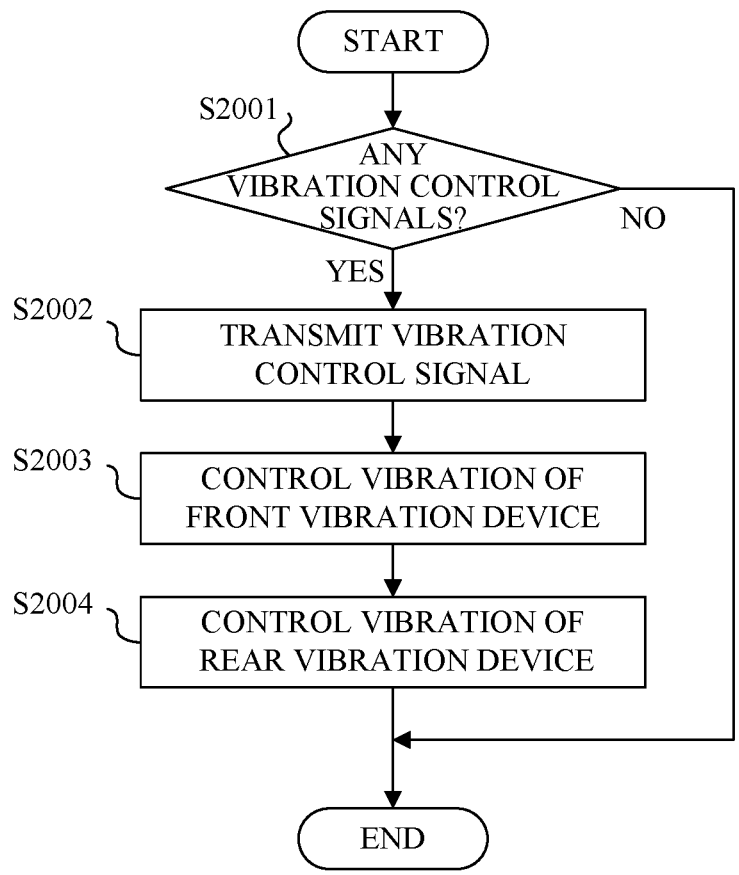
FIG. 14 is a flowchart of vibration control processing according to the third embodiment.

Next follows a description of an example that differently uses the vibration of the front vibration device 100 and the vibration of the rear vibration device 600 provided on the front and rear surface of the camera 10 according to the third embodiment. A flowchart in FIG. 14 illustrates the vibration control processing performed by the controller 501. The controller 501 executes this processing in accordance with a control program as a computer program. This embodiment differently controls the camera 10 between the front vibration device 100 in the front grip portion 101 and the rear vibration device 600 in the rear grip portion 23c on the rear surface side. In the following description, "S" stands for the step.

When the operation unit 40 including the rotational operation member 102, the exposure dial 13, the power button 14, the mode dial 15, the zoom lever 16, the release button 17, and the rear operation unit 21 is operated, a vibration control signal is input to the controller 501. In addition to the operation of the operation member, the vibration control signal is input to the controller 501 from the processing of the image processor 131 so as to inform in-camera processing by vibrating the camera 10 to make the user feel the vibration and to give the touch sense. As described above, the vibration control signals from the pitch IS calculator 121a and the yaw IS calculator 121b are input to the controller 501 in order to detect the pitch and yaw and to prompt the tilt correcting guidance (S2001). If it is determined at S2001 that the controller 501 has input the vibration control signals, the controller 501 outputs the vibration signal to the vibration device driver 134 (S2002). If the control of the front vibration device 100 is required due to the signal which the vibration device driver 134 receives from the controller 501, the vibration device driver 134 operates the front vibration device 100 in a desired operation (S2003). If the control of the rear vibration device 600 is required due to the signal which the vibration device driver 134 receives from the controller 501, the vibration device driver 134 operates the rear vibration device 600 in a desired operation (S2004).

The above control can separately vibrate the front vibration device 100 and the rear vibration device 600, and provide a variety of usages. The example will be given below.

When the rear surface button 21 or the display unit 22 is operated, the rear vibration device 600 is stopped and only the front vibration device 100 is vibrated. This is because the rear surface button 21 is disposed at a location such that it can be easily operated by the thumb gripping the camera 10. The finger is disconnected from the rear grip portion 23c in gripping the camera 10, it is unnecessary to vibrate the rear vibration device 600, and the power saving effect can be obtained. When the rotational operation unit 102 disposed on the front surface of the camera 10 is operated, the front vibration device 100 inside the front grip portion 101 is operated by a vibration magnitude larger than that of the rear vibration device 600. Since the rotational operation member 102 that is being operated is located on the front surface, emphasizing the front vibration device 100 near the member being operated can inform the user of the operation of the rotational operation unit 102. A type of the vibration actuator may be changed for the front vibration device 100 and the rear vibration device 600. For example, the front vibration device 100 may use a vibration actuator using a heavy power consuming and highly responsive piezoelectric element, and the rear vibration device 600 may use a light power consuming LRA type actuator having a high vibration amount. When the rotational operation member 102 provided on the front surface of the camera 10 is operated, the front vibration device 100 using the responsive piezoelectric element is vibrated in order to provide a clear click sense that informs the change of the parameter as the rotational operation member 102 is operated. When the operation other than the rotational operation member 102 is made, the rear vibration device 600 is vibrated using the light power consuming LRA type actuator that can easily vibrate the entire camera 10, or both the front vibration device 100 and the rear vibration device 600 may be vibrated.

The third embodiment discusses the configuration of the first embodiment in which the lens barrel and the camera body are integrated with each other, but the present invention is not limited to this embodiment and is applicable to a camera configuration in which the camera body and the interchangeable lens can be detachable from each other as in the second embodiment. The vibration device may be provided inside the front grip portion or inside the rear grip portion of the camera body, as well as inside the interchangeable lens. Then, the controller 501 provided in the camera body 1000 performs a vibration control for each of the front vibration device 100, the rear vibration device 600, and the lens-side vibration device 220.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-119773, filed on Jun. 25, 2018 and 2019-080723, filed on Apr. 22, 2019 which are hereby incorporated by reference herein in their entirety.

What is claimed is:

1. An image pickup apparatus comprising:
a first vibration device configured to generate a vibration to transmit, to a user, a touch sense in response to an operation of a user on an operation unit;
a grip portion gripped by the user,
a second vibration device disposed inside a rear projection portion in the grip portion configured to cover a rear surface side of the image pickup apparatus; and
a controller configured to instruct the first vibration device and the second vibration device to vibrate when the user operates one of a plurality of operation units operable to make a setup for imaging,
wherein a lens barrel is attached to a front surface side of the image pickup apparatus,
wherein the grip portion covers the rear surface side and the front surface side of the image pickup apparatus,
wherein the grip portion that covers the front surface side of the image pickup apparatus includes a projection portion,
wherein the projection portion is a member that protrudes from the front surface side in an optical axis direction of the lens barrel,
wherein a protrusion portion which transmits a vibration of the first vibration device is disposed inside a facing surface of the projection portion facing the optical axis of the lens barrel,
wherein the protrusion portion is provided in an area of the facing surface of the projection portion configured to contact a fingertip of the user, and
wherein the controller is configured to enable the first vibration device and the second vibration device to provide different vibrations.

2. The image pickup apparatus according to claim 1, further comprising a holder configured to hold the first vibration device inside the projection portion,
wherein the protrusion portion, which is provided on the holder, is exposed to an outside of the facing surface of the projection portion through an opening formed in the projection portion.

3. An image pickup apparatus comprising:
a first vibration device configured to generate a vibration to transmit to a user a touch sense in response to an operation of a user on an operation unit;
a grip portion gripped by the user;
a second vibration device disposed inside a rear projection portion in the grip portion configured to cover a rear surface side of the image pickup apparatus; and
a controller configured to instruct the first vibration device and the second vibration device to vibrate when the user operates one of a plurality of operation units operable to make a setup for imaging,
wherein a lens barrel is attached to a front surface side of the image pickup apparatus,
wherein the grip portion covers the rear surface side and the front surface side of the image pickup apparatus,
wherein the grip portion that covers the front surface side of the image pickup apparatus includes a protrusion portion,
wherein the first vibration device is disposed inside the protrusion portion and on a side facing an optical axis of the lens barrel, and wherein the controller is configured to enable the first vibration device and the second vibration device to provide different vibrations.

4. The image pickup apparatus according to claim 3, further comprising a holder configured to hold the first vibration device inside the grip portion,
wherein the protrusion portion, which is provided on the holder, is exposed to an outside of the grip portion through an opening formed in the grip portion.

5. The image pickup apparatus according to claim 4, wherein the holder is made of a material having a loss coefficient in vibration smaller than that of the grip portion.

6. The image pickup apparatus according to claim 4, wherein the protrusion portion is provided in an area of the grip portion configured to contact a fingertip of the user.

7. The image pickup apparatus according to claim 3, wherein the vibration direction of the first vibration device is set perpendicular to a pressing direction of a fingertip of the user.

8. The image pickup apparatus according to claim 3, wherein the first vibration device is disposed inside a tilted portion, facing the lens barrel, of the protrusion portion of the grip portion that covers the front surface side of the image pickup apparatus.

9. The image pickup apparatus according to claim 3, wherein the first vibration device is attached inside of a plane substantially parallel to the optical axis facing the lens barrel of the protrusion portion of the grip portion that covers the front surface side of the image pickup apparatus.

10. The image pickup apparatus according to claim 3, wherein the lens barrel is attachable to and detachable from the image pickup apparatus, and includes a third vibration device.

11. The image pickup apparatus according to claim 10, wherein the controller controls a vibration of each of the first vibration device, the second device, and the third device.

12. The image pickup apparatus according to claim 3, wherein the grip portion includes a first member to which the first vibration device is attached, and a second member coupled to the first member such that the vibration from the first vibration device is transmitted via the first member.

13. The image pickup apparatus according to claim 1, further comprising a mount portion to which the lens barrel is attachable,
wherein the first vibration device is disposed inside the projection portion and on a side of a surface on a mount portion side of the projection portion.

* * * * *